United States Patent [19]
Yang

[11] Patent Number: 5,383,249
[45] Date of Patent: Jan. 24, 1995

[54] ADJUSTABLE-TYPE ADDITIVE PRESSURE WINDSHIELD WIPER

[76] Inventor: Ming-Tung Yang, No. 4-3, Lane 97, Lung Chuan St., Panchiao, Taipei Hsien, Taiwan, Prov. of China

[21] Appl. No.: 111,881

[22] Filed: Aug. 26, 1993

[51] Int. Cl.$^6$ .............................. B60S 1/04; B60S 1/38
[52] U.S. Cl. ..................... 15/250.42; 15/250.20
[58] Field of Search ........... 15/250.42, 250.41, 250.20, 15/250.35, 250.36

[56] References Cited

U.S. PATENT DOCUMENTS 2,794,203  6/1957  Oishei ............................ 15/250.42
4,766,636  8/1988  Shinpo ........................... 15/250.42
5,138,739  8/1992  Maubray ........................ 15/250.42
5,170,527  12/1992  Lyon, II ........................ 15/250.42

Primary Examiner—David A. Scherbel
Assistant Examiner—Gray K. Graham
Attorney, Agent, or Firm—Bacon & Thomas

[57] ABSTRACT

The invention herein relates to an adjustable-type additive pressure windshield wiper structure, that automatically adjusts the pressure of the windshield wiper blades exerted onto the glass of the windshield and is able to offer stable and effective adjustment functions never available in the past as well as offering the special characteristic of practicality.

5 Claims, 5 Drawing Sheets

ADJUSTABLE-TYPE ADDITIVE PRESSURE WINDSHIELD WIPER

BACKGROUND OF THE INVENTION

The inventor of the invention herein is fully aware that, as commonly seen, the windshield wiper structure of most automobiles consists of a windshield wiper on a glass windshield that sweeps rain and dirt off the windshield to maintain the cleanliness of the glass of the windshield and therein provide the clearness of vision for the driver so as to be effective for safe driving. During the operation of the windshield wiper, if the speed of the automobile is extremely fast, the force of the wind deflects off the windshield and the windshield wipers are blown and lifted off the windshield, thereby causing a situation of insufficient contact of the windshield wiper blades on the windshield and thereby resulting in a greatly reduced cleaning capability. Therefore, some people have undertaken the research and development of a windshield wiper that has an additive pressure plate structure and, as indicated in FIG. 1, the general shape features a number of plate-like foils that can easily be installed onto the framework of the windshield wiper, enabling the additive pressure plates of the windshield wiper, when subjected to the force of the wind, to harness the force of the wind to produce do pressure that increases the downward force of the windshield wiper, raising its cleaning efficiency and fulfilling the effectiveness of the installation. Moreover, there have also been people who have come up with designs to integrate the additive pressure plates into the framework of the windshield wiper, thus enabling the structure of the windshield wiper to have its original tensile pressure as well as the additional pressure provide by the flow of the wind. The aforesaid design can practically enhance the effectiveness of the windshield wiper structure. However, there are certain exceptions to consider. If there is a windshield wiper with installed additive pressure plates or a windshield wiper of integrated design, although there is an effective downward sweeping pressure, still the downward pressure generated produces many shortcomings such as excessive pressure exerted for prolonged periods that causes the windshield wiper to deteriorate, or the windshield wiper greatly overloads and subsequently damages the motor and so on. These additive pressure plates or additive pressure windshield wipers produce serious faults that influence the scope of consumers receptivity to such products.

SUMMARY OF THE INVENTION

The objective of the invention herein is to solve the numerous problems and shortcomings of the aforementioned conventional products and to offer an adjustable-type additive pressure windshield wiper structure that is of a precise and simple configurative assembly, thus enabling windshield wiper operation in which the windshield wiper, under conditions of normal wind force or when the automobile is traveling at low speed, maintains its general windshield wiper sweeping mode and also does not cause excessive pressure to negatively affect the windshield wiper blade or the motor. However, under conditions of extreme wind force or when the automobile is traveling at high speeds, then the additive pressures plates of the invention herein automatically flip open to produce an appropriate downward pressure onto the windshield wipers, thereby enabling the windshield wipers to resist being lifted by the force of the blowing wind. Furthermore, there are supplementary force plates on the windshield wiper arm that turn when the force of the wind is great and thereby harness the principles of gravitational balance to maintain stability during the operation of the windshield wiper, therefore, having the capability to appropriately adjust for the most stable pressure at the ends of the windshield wiper, which also displays brightly colored numbers to alert the driver of the speed of the automobile or velocity of the oncoming wind, a function that can be responded to by lowering vehicle speed and also illustrates the originality, practicality and safety warning features of the invention herein.

The invention herein relates to an adjustable-type additive pressure windshield wiper structure, specifically referring to an additive pressure type windshield wiper that automatically adjusts the pressure of the windshield wiper blades exerted onto the glass of the windshield, which structurally consists of a main frame and support frame with integrated active turning cover-type additive pressure plates and supplementary force plates. Furthermore, both of the aforesaid plates are positioned along the same lateral area within a continuous reduction guide flow channel, enabling when the automobile is being driven and the oncoming wind force is relatively great, the additive pressure plates to automatically turn, which increases the downward pressure of the windshield wipers onto the windshield. Furthermore, when the wind force (when the automobile is traveling at extremely high speed) is greater than a certain preset value, this causes the supplementary force plates to automatically turn, which not only alerts the driver of its operation, but moreover has the capability to augment the stable adjustment function of the windshield wiper.

DETAILED DESCRIPTION OF THE PREFERRED EMBODIMENT

Figure 1:
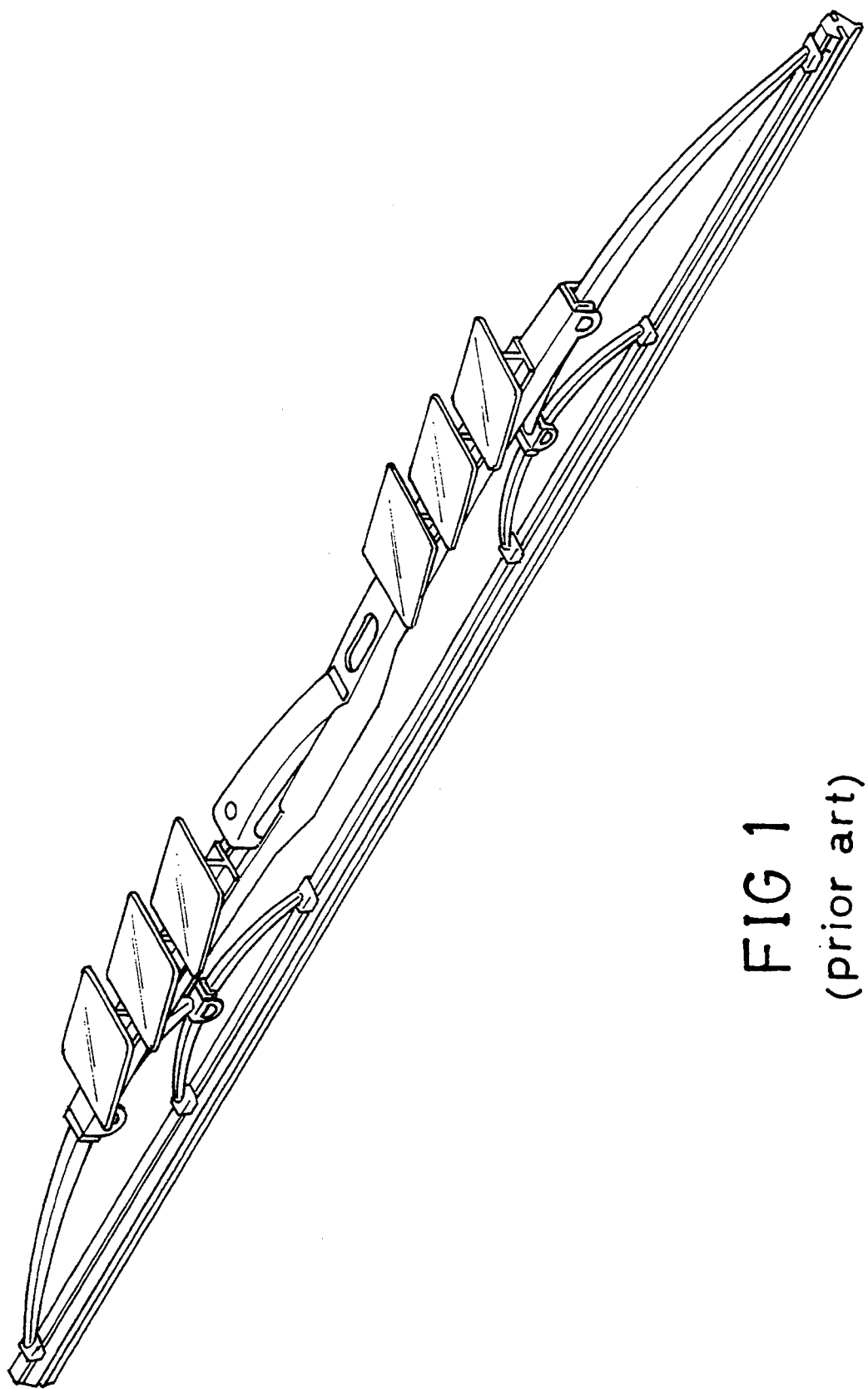
FIG. 1 is a perspective drawing of a windshield wiper equipped with conventional additive pressure plates.
Figure 2:
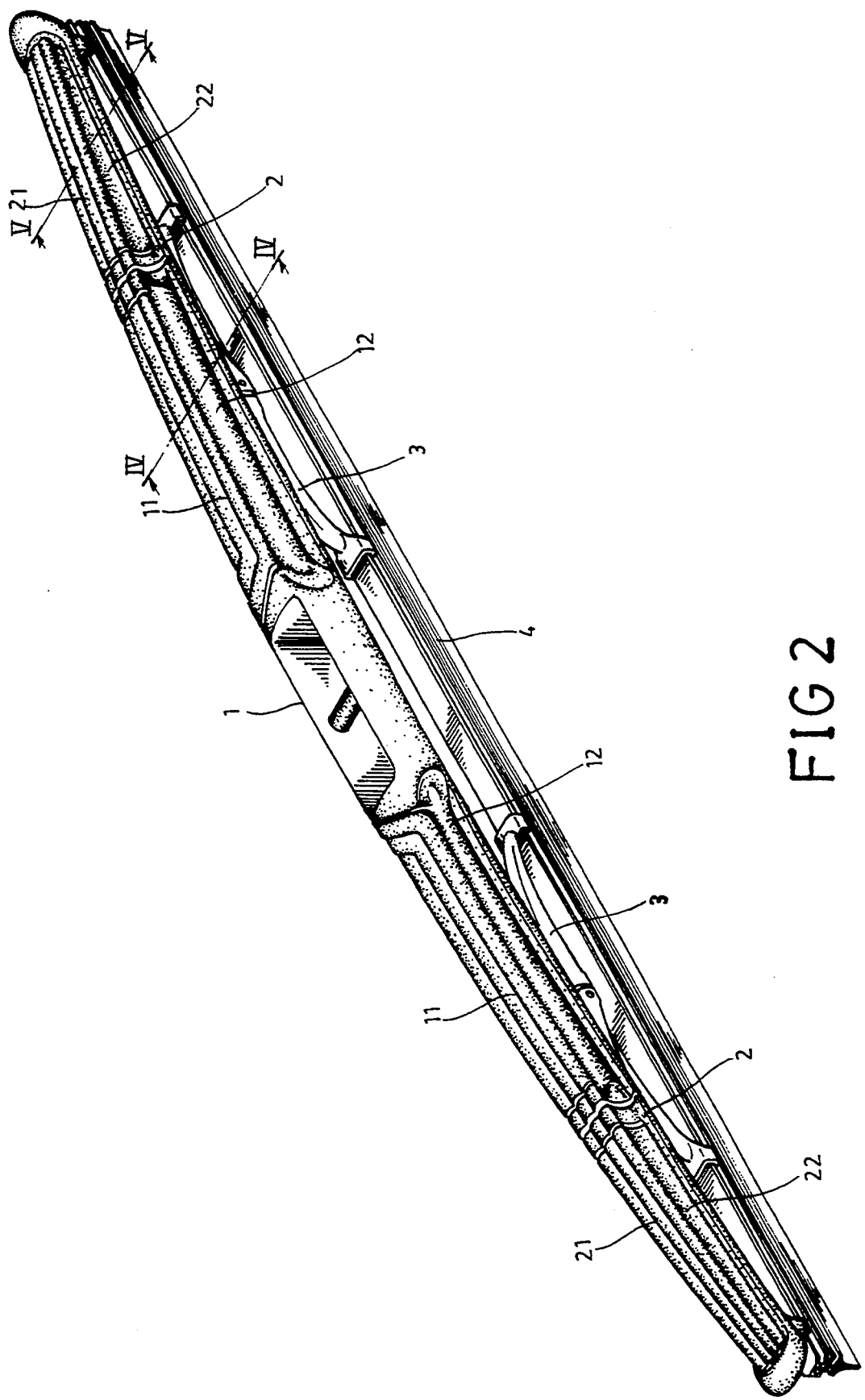
FIG. 2 is a perspective drawing of the windshield wiper invention herein.
Figure 3:
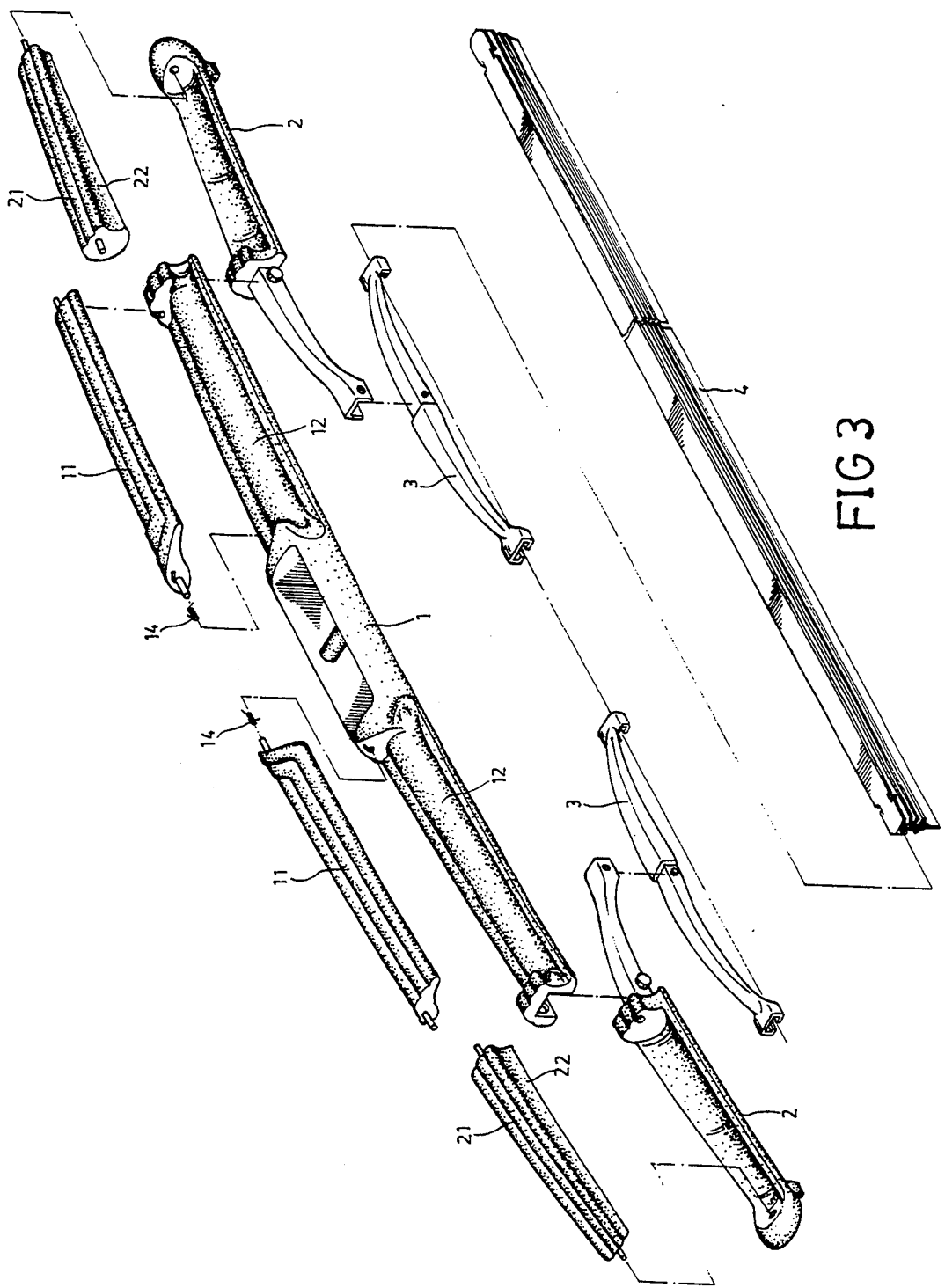
FIG. 3 is an exploded perspective drawing of the windshield wiper invention herein.
Figure 4:
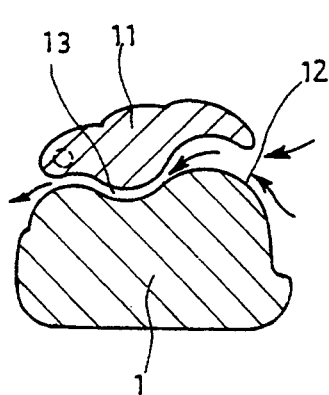
FIG. 4 is a cross-sectional drawing of section IV—IV of the windshield wiper invention herein.
Figure 6:
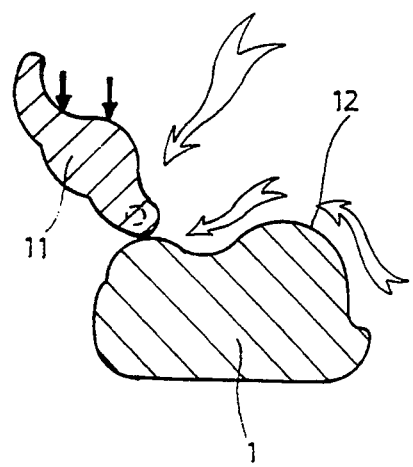
FIG. 6 is a cross-sectional drawing of section IV—IV of the windshield wiper invention herein illustrating the turning operation when the force of the wind is great.
Figure 5:
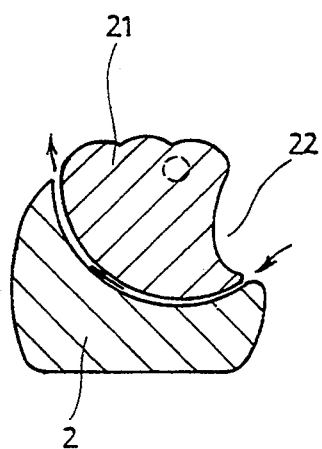
FIG. 5 is a cross-sectional drawing of section V—V of the windshield wiper invention herein.
Figure 7:
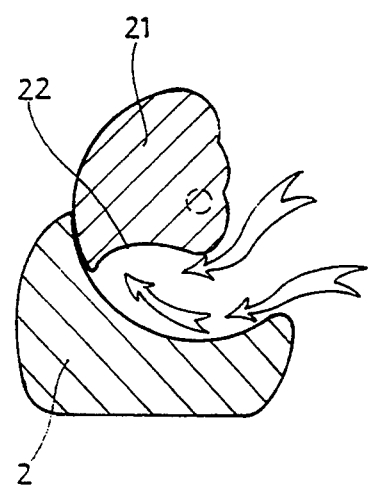
FIG. 7 is a cross-sectional drawing of section V—V of the windshield wiper invention herein illustrating the turning operation when the force of the wind is great.
Figure 8:
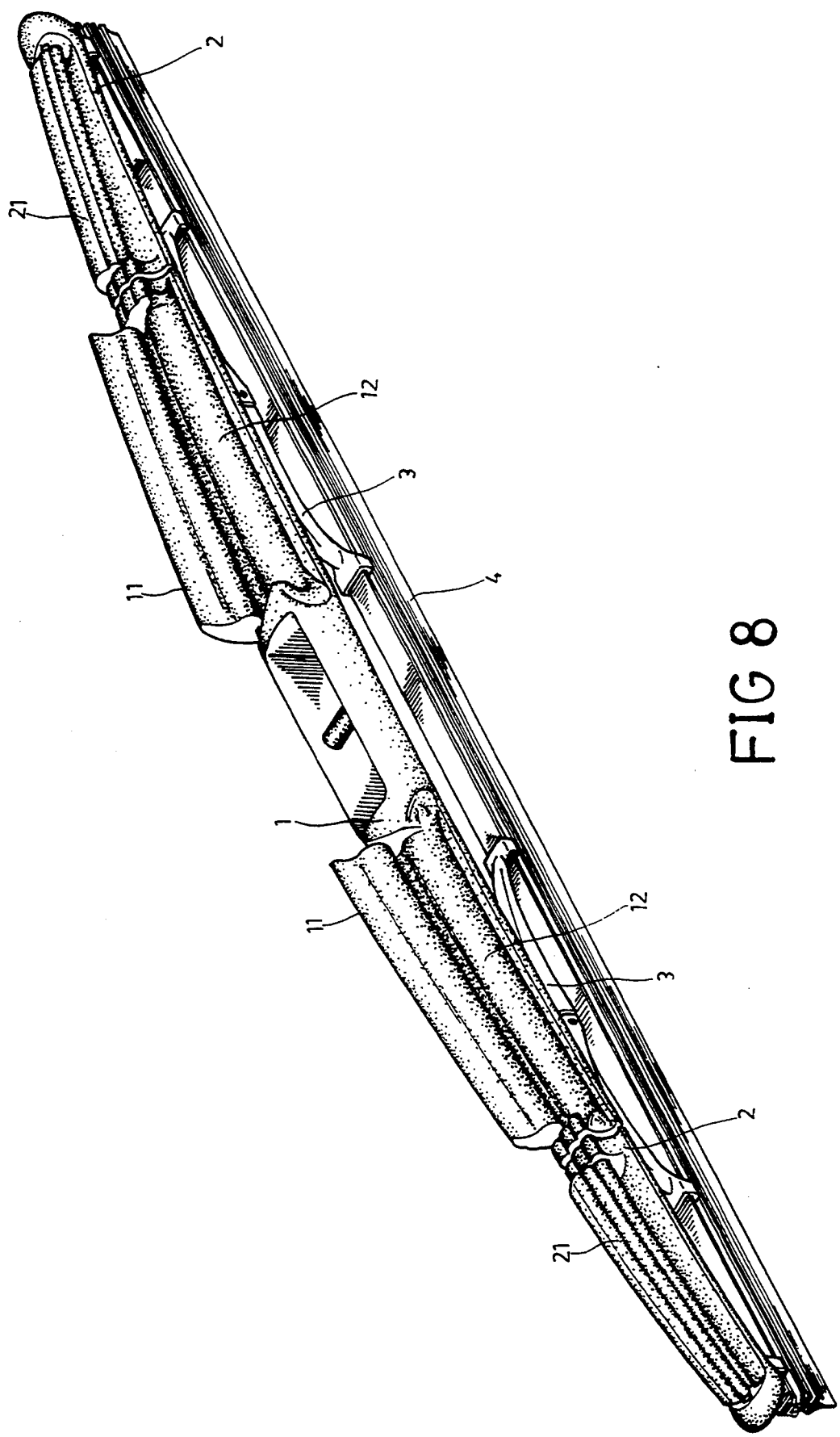
FIG. 8 is a perspective drawing of the windshield wiper invention herein illustrating the structural configuration when the force of the wind is great.

As indicated in FIG. 2 and FIG. 3, the isometric and exploded drawings, respectively, of the invention herein, the invention herein is an adjustable-type additive pressure windshield wiper structure, that automatically adjusts the pressure of the windshield wiper blades exerted onto the glass of the windshield, which structurally includes a main frame (1), a support frame (2), a minor frame (3) and windshield wiper blades (4). The main frame (1) consists of the main structure as assembled onto the windshield wiper arm with a support frame (2) attached at the two ends of the windshield wiper arm, while positioned on two sides of the main frame (1) are active outward turning-type additive pressure plates (11). At each end of these additive pressure plates (11) supplementary torque springs (14) in the form of insertable-type shaft pins that can be easily inserted into and attached to the main frame (1) and, furthermore, maintain a tensile closing action while also retaining the capability of turning outward under force. The additive pressure plate (11) at the lower end opening of the main frame (1) facing the oncoming wind laterally is positioned on the continuous reduction guide flow channel (12), and at the lower end of the additive pressure plate (11) is an S-shaped contoured recess. Between the additive pressure plate (11) and the main frame (1) is an air flow crevice (13), but where the opening end meets the continuous reduction guide flow channel (12) is formed a broad recess collector flow groove that enables, when the main frame (1) is subjected to the force of the wind, a small volume of wind to accumulate within the air flow crevice (13) and be directly discharged; however, when the force of the wind is great and the wind cannot be discharged and furthermore the wind force is greater that torque of the spring (14), then the wind force will turn the additive pressure plate (11) outward, and thus, as illustrated in FIG. 4 and FIG. 6, constitute the automatic additive pressure structure on the main frame (1) of the windshield wiper. When the force of the wind becomes less or decreases, due to the operative torque of the spring (14), the additive pressure plate (11) returns to cover the main frame (1) and the normal windshield wiper operating conditions are restored. The support frame (2) consists of an connection assembly for attachment to the lateral end of the main frame (1) and the attachment structures along the underside of the minor frame (3) and the windshield wiper blade (4). Along the upper surface is positioned the active outward turning-type supplementary force plate (21). These supplementary force plates (21) are retained under pressure by inserted-type shaft pins which maintain active turning capability when attached onto the support frame (2) and faces the oncoming wind at the lateral end of the continuous reduction guide flow channel (12) and has a matching contoured recess guide flow surface (22). Positioned on the lower surface are colored operation indicators that enable, when the force of the wind is great, appropriately large or small adjustments based on rotational movement caused by gravitational force, but when the force of the wind is extremely powerful or the speed of the automobile is very fast, then the supplementary force plate (21) will turn outward to a suitable angle, as illustrated in FIG. 5 and FIG. 7. The appropriate adjustment of the downward pressure of the windshield wiper onto the glass of the windshield enables the upper and lower ends of the windshield wiper to avoid a situation wherein either end may be lifted and, at the same time, increases the effective adjustment of the windshield wiper for stable operation. Furthermore, the windshield wiper can display warning indications that alert the driver that the wind velocity is greatly excessive and the speed of the automobile should be reduced for safety considerations. Thus, the overall structural composition and installation of the invention herein consists of a main frame (1) and a support frame (2) and, after the positioning and installation of the additive pressure plate (11) and the supplementary force plate (21) according to procedure onto the main frame (1), the minor frame (3) and windshield wiper blades (4) complete the assembly process of the adjustable-type additive pressure windshield wiper which can then be installed on a windshield of an automobile. When the automobile has an oncoming wind that is not great or the speed of the automobile is relatively slow, the continuous reduction guide flow channel (12) on the main frame (1) and the air flow crevice (13) are in a discharge mode, wherein the wind force against the support frame (2) is insufficient to cause the supplementary force plate (21) to turn outward and thus the adjustable-type additive pressure windshield wiper remains in the same state as a most conventional windshield wipers. When the force of the wind is relatively great or the speed of the automobile is relatively fast, the oncoming wind cannot completely pass through the air flow crevice (13) on the main frame (1) and since the accumulated wind force is greater than the torque of the spring, then the additive pressure plate (11) is turned outward by the force and, hence, the adjustment of the windshield wiper occurs. Furthermore, the supplementary force plate (21) on the support frame (2) is outwards at the same time by the force of the wind, as illustrated in FIG. 8, thus realizing the effective function offered by the design. The torque of the spring and the power of the supplementary force plate (21) both enable the appropriate control in any kind of wind setting or automobile speed by outward at the proper time to the usable effectiveness of the windshield wiper. Furthermore, the windshield wiper can display indicator colors after turning outward to remind the driver to be cautious or respond by reducing driving speed and so on. Not only does the invention herein offer a new type practicality, the invention herein is also able to offer functions never available in the past, including numerous types of applications and a windshield wiper structural design of high safety value.

What is claimed is:

1. A windshield wiper blade for a vehicle comprising:
   a) a main frame having a first surface;
   b) at least one pressure plate having a second surface and pivotally attached to the main frame so as to be movable between a closed position wherein the second surface faces the first surface so as to define an air flow channel therebetween and an open position wherein the second surface faces away from the first surface;
   c) biasing means connected to the at least one pressure plate to normally bias the pressure plate toward its closed position whereby a predetermined force acting on the pressure plate caused by air passing through the air flow channel will move the pressure plate to its open position;
   d) at least one support frame attached to the main frame;
   e) at least one supplementary force plate defining an air guide flow surface and pivotally attached to the at least one support frame so as to be movable between a closed position wherein the air guide surface faces away from the at least one support frame and an open position wherein the guide surface faces toward the at least one support frame; and,
   f) a wiper blade attached to the at least one support frame.

2. The windshield wiper blade of claim 1 comprising two pressure plates pivotally attached to the main frame.

3. The windshield wiper blade of claim 1 wherein the main frame has opposite ends and further comprising a support frame attached to each end of the main frame.

4. The windshield wiper blade of claim 1 wherein the air flow channel has a generally "S"-shaped configuration.

5. The windshield wiper blade of claim 1 wherein the air guide flow surface is concavely curved.

* * * * *